(12) United States Patent  
Baek et al.

(10) Patent No.: US 11,727,852 B2
(45) Date of Patent: Aug. 15, 2023

(54) DISPLAY DEVICE AND ELECTRONIC DEVICE INCLUDING THE SAME

(71) Applicant: Samsung Display Co., Ltd., Yongin-Si (KR)

(72) Inventors: Yunki Baek, Suwon-si (KR); Jinpil Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/833,089

(22) Filed: Jun. 6, 2022

(65) Prior Publication Data
US 2023/0048041 A1 Feb. 16, 2023

(30) Foreign Application Priority Data
Aug. 10, 2021 (KR) ........................ 10-2021-0105056

(51) Int. Cl.
*G06F 3/041* (2006.01)
*G09G 3/20* (2006.01)
*G09G 5/391* (2006.01)
*G02B 27/01* (2006.01)

(52) U.S. Cl.
CPC ......... *G09G 3/2092* (2013.01); *G02B 27/017* (2013.01); *G09G 5/391* (2013.01); *G02B 2027/0147* (2013.01); *G09G 2300/0809* (2013.01); *G09G 2310/0264* (2013.01); *G09G 2320/0261* (2013.01); *G09G 2370/08* (2013.01)

(58) Field of Classification Search
CPC .... G09G 3/2092; G09G 5/391; G02B 27/017; G02B 2027/0147
USPC ........................................................ 345/173
See application file for complete search history.

(56) References Cited

U.S. PATENT DOCUMENTS

| | | | |
|---|---|---|---|
| 7,495,368 B2 | 2/2009 | Lamvik et al. | |
| 7,495,638 B2 | 2/2009 | Lamvik et al. | |
| 10,885,883 B2 | 1/2021 | Knez et al. | |
| 10,948,722 B2 | 3/2021 | Miller et al. | |
| 2016/0202483 A1* | 7/2016 | Seo ....................... | G02B 27/017 359/630 |
| 2016/0217551 A1* | 7/2016 | Kim ....................... | G09G 5/005 |
| 2020/0381363 A1* | 12/2020 | Wu ....................... | H01L 25/0753 |
| 2021/0043700 A1* | 2/2021 | Park ....................... | H10K 50/82 |
| 2021/0181887 A1* | 6/2021 | Cha ....................... | G06F 3/0202 |

FOREIGN PATENT DOCUMENTS

KR 10-2019-0082916 A 7/2019
KR 10-2020-0042140 A 4/2020

OTHER PUBLICATIONS https://www.theverge.com/2016/7/22/12260430/nvidia-foveated-rendering-vr-graphics-smi-eye-tracking-siggraph.

* cited by examiner

*Primary Examiner* — Jonathan M Blancha
(74) *Attorney, Agent, or Firm* — Innovation Counsel LLP

(57) ABSTRACT

Disclosed is a display device which includes a display panel that includes a plurality of pixels and includes a display area displaying an image, a panel controller that receives an external input signal from an external source and generates a control signal for dividing the display area into a first area and a second area which is disposed adjacent to the first area based on the external input signal, and an instrument module that stretches the first area and the second area of the display panel in response to the control signal. The number of the pixels per unit area in the first area is different from the number of the pixels per unit area in the second area.

20 Claims, 14 Drawing Sheets

DISPLAY DEVICE AND ELECTRONIC DEVICE INCLUDING THE SAME

CROSS-REFERENCE TO RELATED APPLICATIONS

This application claims priority under 35 U.S.C. § 119 to Korean Patent Application No. 10-2021-0105056 filed on Aug. 10, 2021, in the Korean Intellectual Property Office, the disclosures of which are incorporated by reference herein in their entireties.

BACKGROUND

1. Field

The present disclosure generally relates to a display device and an electronic device including the same, and more particularly, relates to a display device with the improved quality of image and an electronic device including the same.

2. Description of the Related Art

Various types of display devices are being used to provide image information. A display device displays image information in a screen on which an image is displayed. Nowadays, a stretchable display device including a flexible display panel is being developed. Unlike a rigid display device, the stretchable display device may be folded, rolled, bent, or stretched like paper. The stretchable display device, the shape of which is variously changed, may be carried without limitation on a screen size and may be easily disposed even in a curved object, thus providing the user with improved usability.

SUMMARY

Embodiments of the present disclosure provide a stretchable display device and an electronic device capable of adjusting the number of pixels disposed in an area, in which a high-resolution image is to be displayed, by using a stretchable characteristic.

According to an embodiment, a display device includes a display panel that includes a plurality of pixels and a display area to display an image, a panel controller that receives an external input signal from an external source and generates a control signal for dividing the display area into a first area and a second area which is disposed adjacent to the first area based on the external input signal, and an instrument module that stretches the first area and the second area of the display panel in response to the control signal, and the number of the pixels per unit area in the first area is different from the number of the pixels per unit area in the second area.

As an embodiment of the present disclosure, the instrument module includes an instrument part disposed under the display panel to stretch the first area and the second area of the display panel. The instrument module includes an instrument controller that controls a movement of the instrument part in response to the control signal.

As an embodiment of the present disclosure, the instrument part includes a plurality of first sub-instrument parts spaced apart from each other in a first direction, and a plurality of second sub-instrument parts spaced apart from each other in a second direction intersecting the first direction. The instrument controller controls a movement of first and second sub-instrument parts overlapping the first area from among the first and second sub-instrument parts such that the first area of the display panel is stretched. The instrument controller controls a movement of first and second sub-instrument parts overlapping the second area from among the first and second sub-instrument parts such that the second area of the display panel is stretched.

As an embodiment of the present disclosure, the display panel displays the image in a third direction. The instrument controller allows the instrument part to be stretched in the third direction or a direction facing away from the third direction such that the first area and the second area of the display panel are stretched.

As an embodiment of the present disclosure, the panel controller receives video signals from the external source and generates image data based on the video signals.

As an embodiment of the present disclosure, the panel controller includes a signal dividing part that divides the video signals into a first video signal corresponding to the first area and a second video signal corresponding to the second area based on the control signal. The panel controller includes a correction part that corrects the second video signal to generate a corrected video signal.

As an embodiment of the present disclosure, the video signals, the first video signal, and the second video signal are video signals corresponding to a first resolution. The corrected video signal is corrected to correspond to a second resolution which is lower than the first resolution.

As an embodiment of the present disclosure, the first resolution is determined by the number of the pixels per unit area in the first area. The second resolution is determined by the number of the pixels per unit area in the second area.

As an embodiment of the present disclosure, the panel controller further includes a control signal generating part that receives the external input signal, divides the display area into the first area and the second area based on the external input signal, and generates the control signal in order to control the number of the pixels per unit area in the first area and the number of the pixels per unit area in the second area.

As an embodiment of the present disclosure, the instrument controller receives the control signal from the control signal generating part.

As an embodiment of the present disclosure, the panel controller further includes a data converting part that receives the first video signal and the corrected video signal, and generates the image data based on the first video signal and the corrected video signal.

As an embodiment of the present disclosure, the external input signal includes information regarding the gaze that a user provides to the display device. The panel controller generates the control signal such that an area of the display area, where the gaze of the user face, is included in the first area. The number of the pixels per unit area in the first area is larger than the number of the pixels per unit area in the second area.

According to an embodiment, an electronic device includes a display device that displays an image, and an input detecting module that detects an external input that a user provides to the display device. The display device includes a display panel that includes a plurality of pixels and a display area to display the image. The display device includes a panel controller that receives an external input signal from the input detecting module and generates a control signal for dividing the display area into a first area and a second area which is disposed adjacent to the first area based on the external input signal. The display device includes an instrument module that stretches the first area and the second area of the display panel in response to the control signal. The number of the pixels per unit area in the first area is different from the number of the pixels per unit area in the second area.

As an embodiment of the present disclosure, the external input signal includes information regarding gaze that the user provides to the display device.

As an embodiment of the present disclosure, the panel controller generates the control signal such that an area of the display area, where the gaze of the user face is at, is included in the first area. The number of the pixels per unit area in the first area is larger than the number of the pixels per unit area in the second area.

As an embodiment of the present disclosure, the electronic device further includes a video input module that generates external video signals and transmits a video signal obtained by converting the external video signals to the panel controller.

As an embodiment of the present disclosure, the video input module receives the control signal from the panel controller. The video input module includes an external video dividing part that divides the external video signals into a first external video signal corresponding to the first area and a second external video signal corresponding to the second area based on the control signal. The video input module includes an external image correcting part that corrects the second external video signal to generate a corrected external video signal. The video input module includes a video converting part that converts the first external video signal and the corrected external video signal to generate the video signal.

As an embodiment of the present disclosure, the external video signals, the first external video signal, and the second external video signal are signals set based on a first resolution. The corrected external video signal is based on a second resolution which is lower than the first resolution.

As an embodiment of the present disclosure, the first resolution is determined by the number of the pixels per unit area in the first area. The second resolution is determined by the number of the pixels per unit area in the second area.

As an embodiment of the present disclosure, the external input signal includes information about an application executed in the electronic device by the user.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
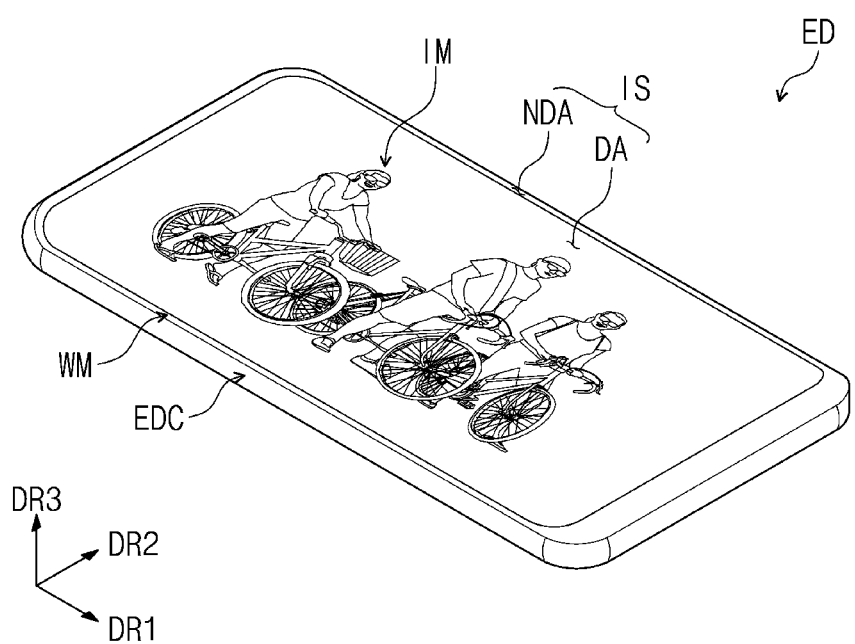
FIG. 1 is a perspective view of an electronic device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numerals refer to the same components. Also, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to accompanying drawings.

Figure 2:
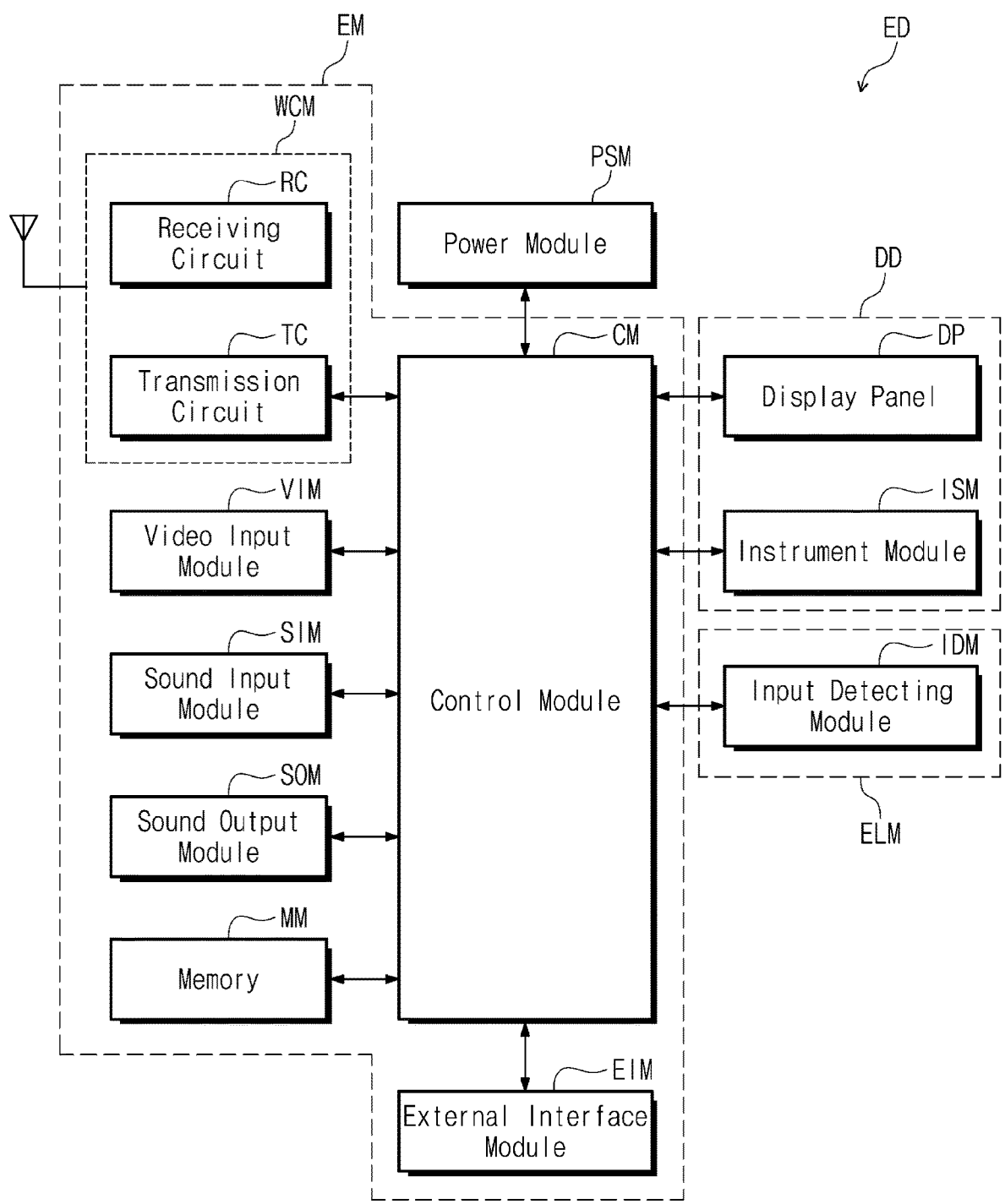
FIG. 2 is a block diagram of an electronic device according to an embodiment of the present disclosure.

FIG. 1 is a perspective view of an electronic device according to an embodiment of the present disclosure, and FIG. 2 is a block diagram of an electronic device according to an embodiment of the present disclosure.

Referring to FIG. 1, an electronic device ED may be a device that is activated depending on an electrical signal. The electronic device ED according to the present disclosure may be a small and medium-sized electronic device, such as a mobile phone, a tablet, a vehicle navigation system, a game console, or a head-mounted device, as well as a large-sized electronic device, such as a television or a monitor. The above examples are provided only as an embodiment, and it is obvious that the electronic device ED may be applied to any other electronic device(s) without departing from the concept of the present disclosure. The electronic device ED has a rectangular shape having a long side in a first direction DR1 and a short side in a second direction DR2 intersecting the first direction DR1. However, the shape of the electronic device ED is not limited thereto. For example, the electronic device ED may be implemented in various shapes.

The electronic device ED may display an image IM on a display surface IS parallel to each of the first direction DR1 and the second direction DR2, so as to face a third direction DR3. The display surface IS on which the image IM is displayed may correspond to a front surface of the electronic device ED.

In this embodiment, a front surface (or an upper/top surface) and a rear surface (or a lower/bottom surface) of each member are defined with respect to a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the electronic device ED in the third direction DR3. Meanwhile, directions that the first, second, and third directions DR1, DR2, and DR3 indicate may be relative in concept and may be changed to different directions.

The electronic device ED may sense an external input applied from the outside. The external input may include various types of inputs that are provided from the outside of the electronic device ED. The electronic device ED according to an embodiment of the present disclosure may sense an external input of a user, which is applied from the outside. The external input of the user may be one of various types of external inputs, such as a part of his/her body, a light, heat, his/her eye, and pressure, or a combination thereof. Also, the electronic device ED may sense the external input of the user, which is applied to the side surface or rear surface of the electronic device ED depending on a structure of the electronic device ED, and is not limited to one embodiment. As an example of the present disclosure, an external input may include an input by an input device (e.g., a stylus pen, an active pen, a touch pen, an electronic pen, or an E-pen).

The display surface IS of the electronic device ED may comprise a display area DA and a non-display area NDA. The display area DA may be an area in which the image IM is displayed. The user perceives (or views) the image IM through the display area DA. In this embodiment, the display area DA is illustrated in the shape of a quadrangle whose vertexes are rounded. However, this is illustrated as an example. The display area DA may have various shapes, not limited to any one embodiment.

The non-display area NDA is disposed adjacent to the display area DA. The non-display area NDA may have a given color. The non-display area NDA may surround the display area DA. As such, a shape of the display area DA may be defined substantially by the non-display area NDA. However, this is illustrated as an example. The non-display area NDA may be disposed adjacent to only one side of the display area DA or may be omitted. The electronic device ED according to an embodiment of the present disclosure may include various embodiments and is not limited to any one embodiment.

As an example of the present disclosure, the electronic device ED may include a window WM, a display device DD (refer to FIG. 2), and an outer case EDC.

The window WM may be formed of a transparent material capable of outputting the image IM. For example, the window WM may be formed of glass, sapphire, plastic, or the like. An example in which the window WM is implemented with a single layer is illustrated, but the present disclosure is not limited thereto. For example, the window WM may include a plurality of layers.

Meanwhile, although not illustrated, the non-display area NDA of the electronic device ED described above may correspond to an area that is defined by printing a material including a given color on one area of the window WM. As an example of the present disclosure, the window WM may include a light blocking (or shielding) pattern for defining the non-display area NDA. The light blocking pattern that is a colored organic film may be formed, for example, in a coating manner.

The outer case EDC may be coupled to the window WM to define an outer appearance of the display device DD. The outer case EDC may absorb external shocks from the outside and may prevent a foreign material/moisture or the like from being infiltrated into the display device DD such that components accommodated in the outer case EDC are protected. As an example of the present disclosure, the outer case EDC may be implemented by coupling a plurality of accommodating members.

The display device DD according to an embodiment of the present disclosure may be a stretchable display device. In the case of the stretchable display device, a shape of the display device DD may be changed by operations such as bending, folding, rolling, sliding, and stretching. As an example of the present disclosure, the display device DD may be stretched in at least one of the first direction DR1, the second direction DR2, and the third direction DR3. However, this is an example. In another example, the display device DD may be stretched in two or three directions. As the stretchable display device DD is stretched, the size of the display device DD may change. Further, as the stretchable display device DD is stretched, the display surface IS may also be bent, folded, rolled, or stretched. The display device DD may display the image IM through the stretched display surface IS. Further, as an example of the present disclosure, the electronic device ED including the display device DD may also be stretchable. In this case, the window WM and the outer case EDC may also be stretchable.

Referring to FIGS. 1 and 2, the electronic device ED may include the display device DD, an electronic module EM, an electronic light module ELM, and a power module PSM.

The display device DD generates the image IM. The display device DD includes a display panel DP and an instrument module ISM (refer to FIG. 4).

The display panel DP according to an embodiment of the present disclosure may be a light-emitting display panel. As an example, the display panel DP may include a light-emitting display panel such as an organic light-emitting display panel, an inorganic light-emitting display panel, or a quantum dot light-emitting display panel. An emission layer of the organic light-emitting display panel may include an organic light-emitting material. An emission layer of the inorganic light-emitting display panel may include an inorganic light-emitting material. An emission layer of the quantum dot light-emitting display panel may include a quantum dot, a quantum rod, etc. Below, the description will be given under the condition that the display panel DP is an organic light-emitting display panel in this embodiment.

The display panel DP may output the image IM, and the output image IM may be displayed on the display surface IS.

The instrument module ISM may be disposed under the display panel DP. The instrument module ISM may stretch the display panel DP. The display panel DP and the instrument module ISM will be described with reference to FIGS. 4, 5, 6A, 6B, 7A, 7B, and 8.

The electronic module EM may include a control module CM, a wireless communication module WCM, a video input module VIM, a sound input module SIM, a sound output module SOM, a memory MM, and an external interface module EIM. The modules CM, WCM, VIM, SIM, SOM, MM, and EIM may be mounted on a circuit board or may be electrically connected with each other through a flexible circuit board. The electronic module EM is electrically connected with the power module PSM.

The control module CM controls the overall operation of the electronic device ED. For example, the control module CM may activate or deactivate the display device DD so as to correspond to a user input. The control module CM may control the video input module VIM, the sound input module SIM, the sound output module SOM, and the like so as to correspond to the user input. The control module CM may include at least one microprocessor.

The wireless communication module WCM may transmit/receive a wireless signal to/from any other terminal by using a Bluetooth or Wi-Fi line. The wireless communication module WCM may transmit/receive a voice signal by using a general communication line. The wireless communication module WCM includes a transmission circuit TC that modulates and transmits a signal to be transmitted, and a receiving circuit RC that demodulates a received signal.

The video input module VIM generates an external video signal EVS (refer to FIG. 12) and converts the external video signal EVS into a video signal RGB (refer to FIG. 4) capable of being displayed on the display device DD. In a record mode or a voice recognition mode, the sound input module SIM receives an external sound signal through a microphone and converts the received signal into electrical voice data. The sound output module SOM converts sound data received from the wireless communication module WCM or sound data stored in the memory MM so as to be output to the outside.

The external interface module EIM functions as an interface for connection with an external charger, a wired/wireless data port, a card socket (e.g., a memory card, a SIM/UIM card socket), and the like.

The power module PSM supplies a power necessary for the overall operation of the electronic device ED. The power module PSM may include a general battery device.

The electronic light module ELM may be an electronic part transmitting or receiving a light signal. The electronic light module ELM transmits or receives a light signal through a partial area of a transparent area. In this embodiment, the electronic light module ELM may include an input detecting module IDM. The input detecting module IDM may detect an external input that a user US (refer to FIG. 3) provides to the display device DD. As an example of the present disclosure, the input detecting module IDM may include an infrared sensor or the like. The input detecting module IDM may track the eyes of the user US by emitting an infrared light to the eye of the user US and then receiving an infrared light reflected from the cornea of the eye.

Figure 3:
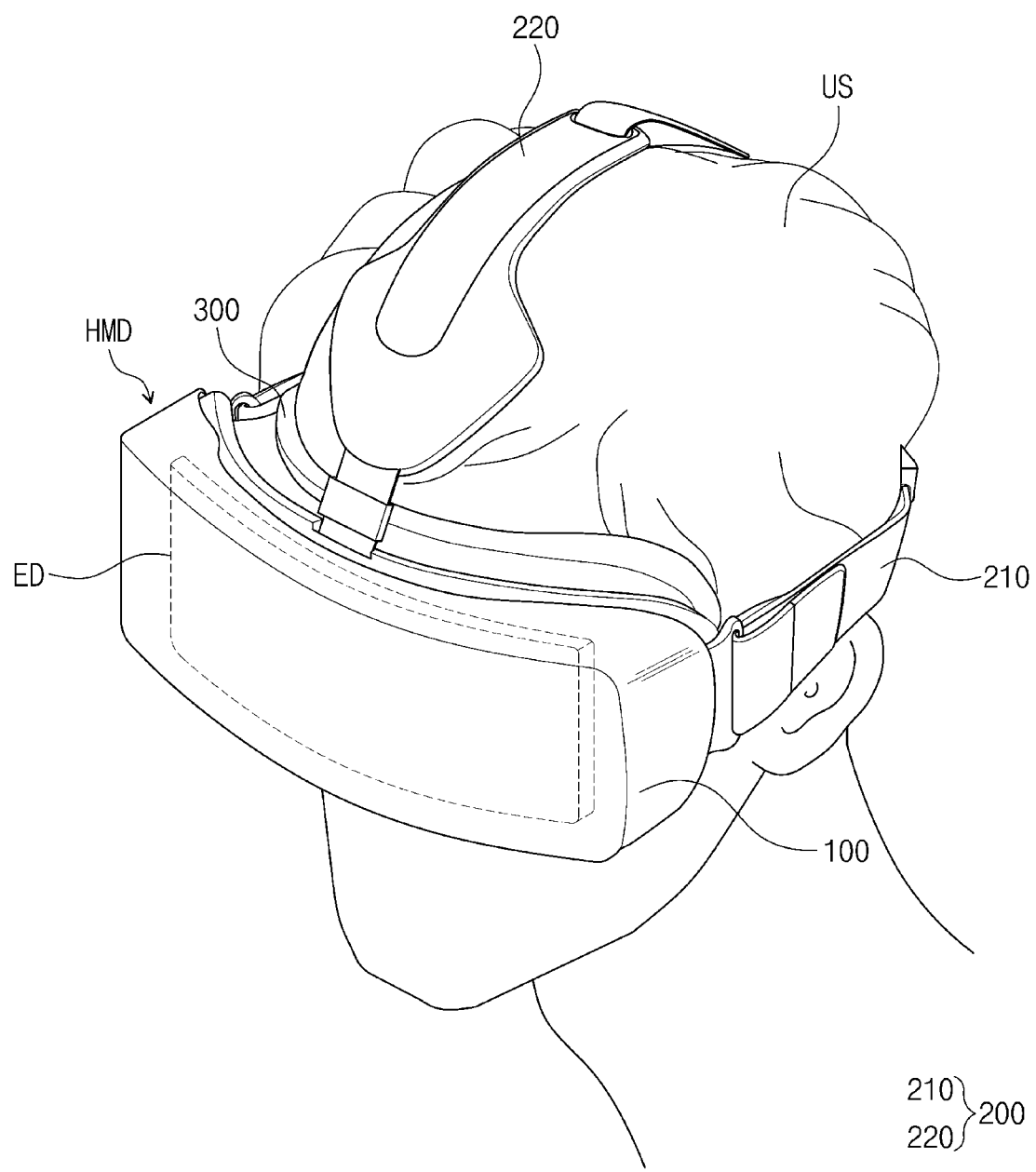
FIG. 3 is a perspective view of an electronic device according to an embodiment of the present disclosure.

FIG. 3 is a perspective view of an electronic device according to an embodiment of the present disclosure.

As an example of the present disclosure, a head mounted device HMD being one of electronic devices is illustrated in FIG. 3.

The head mounted device HMD is a device that is worn on a head of the user US. The head mounted device HMD may block a peripheral view of the user US and allows only the image IM (refer to FIG. 1) provided through the head mounted device HMD to be provided to the user US. Accordingly, the user US using the head mounted device HMD may be easily immersed in the image IM.

The head mounted device HMD may include a frame 100, a support member 200, a cushion member 300, and the electronic device ED. An example is illustrated in FIG. 3 as the head mounted device HMD includes the electronic device ED separately, but the present disclosure is not limited thereto. For example, the head mounted device HMD may be one electronic device. Below, for convenience, the description will be given as the electronic device ED described with reference to FIGS. 1 and 2 is included in the head mounted device HMD.

The frame 100 may be worn on the head of the user US. A seating space may be provided in the frame 100, and the electronic device ED may be installed in the seating space. As an example of the present disclosure, the electronic device ED may be partially exposed to the outside in a state of being installed in the frame 100. The user US may control the head mounted device HMD by using the exposed portion of the electronic device ED.

The support member 200 may be coupled to the frame 100 such that the frame 100 may be easily worn on the user US. As an example of the present disclosure, the support member 200 may include a main strap 210 and a top strap 220.

The main strap 210 may be worn along a circumference of the head of the user US. The main strap 210 may fix the frame 100 to the user US such that the frame 100 is in close contact with the head of the user US. The top strap 220 may connect the frame 100 and the main strap 210 along an upper part of the head of the user US. The top strap 220 may prevent the frame 100 from flowing down. Also, the top strap 220 may distribute the weight of the frame 100 to provide improved wearing sensation to the user US. The main strap 210 and the top strap 220 are illustrated in FIG. 2 in the shape of being adjustable in length, but the present disclosure is not limited thereto. For example, in another embodiment, the main strap 210 and the top strap 220 may be elastic. In this case, a part capable of adjusting a length may be omitted. Also, as an example of the present disclosure, the support member 200 may be implemented in various shapes, as well as the shape disclosed in FIG. 2. For example, in another embodiment of the present invention, the top strap 220 may be omitted. Also, in another embodiment of the present disclosure, the support member 200 may be implemented in various shapes such as a helmet coupled to the frame 100 or a shape of a glasses leg coupled to the frame 100.

The cushion member 300 may be disposed between the frame 100 and the head of the user US. The cushion member 300 may allow the frame 100 to be in close contact with the user US, thus improving the wearing sensation of the user US. The cushion member 300 may be detached from the frame 100. As an example of the present disclosure, the cushion member 300 may be omitted.

As an example of the present disclosure, the head mounted device HMD may communicate with the electronic device ED. The frame 100 may include a connector therein; when the electronic device ED is installed in the frame 100, the connector may be physically connected with an input terminal of the electronic device ED. However, the present disclosure is not limited thereto. For example, the head mounted device HMD and the electronic device ED may exchange signals with each other wirelessly through the wireless communication using the Bluetooth or Wi-Fi line. In this case, a communication module may be embedded in each of the head mounted device HMD and the electronic device ED.

Figure 4:
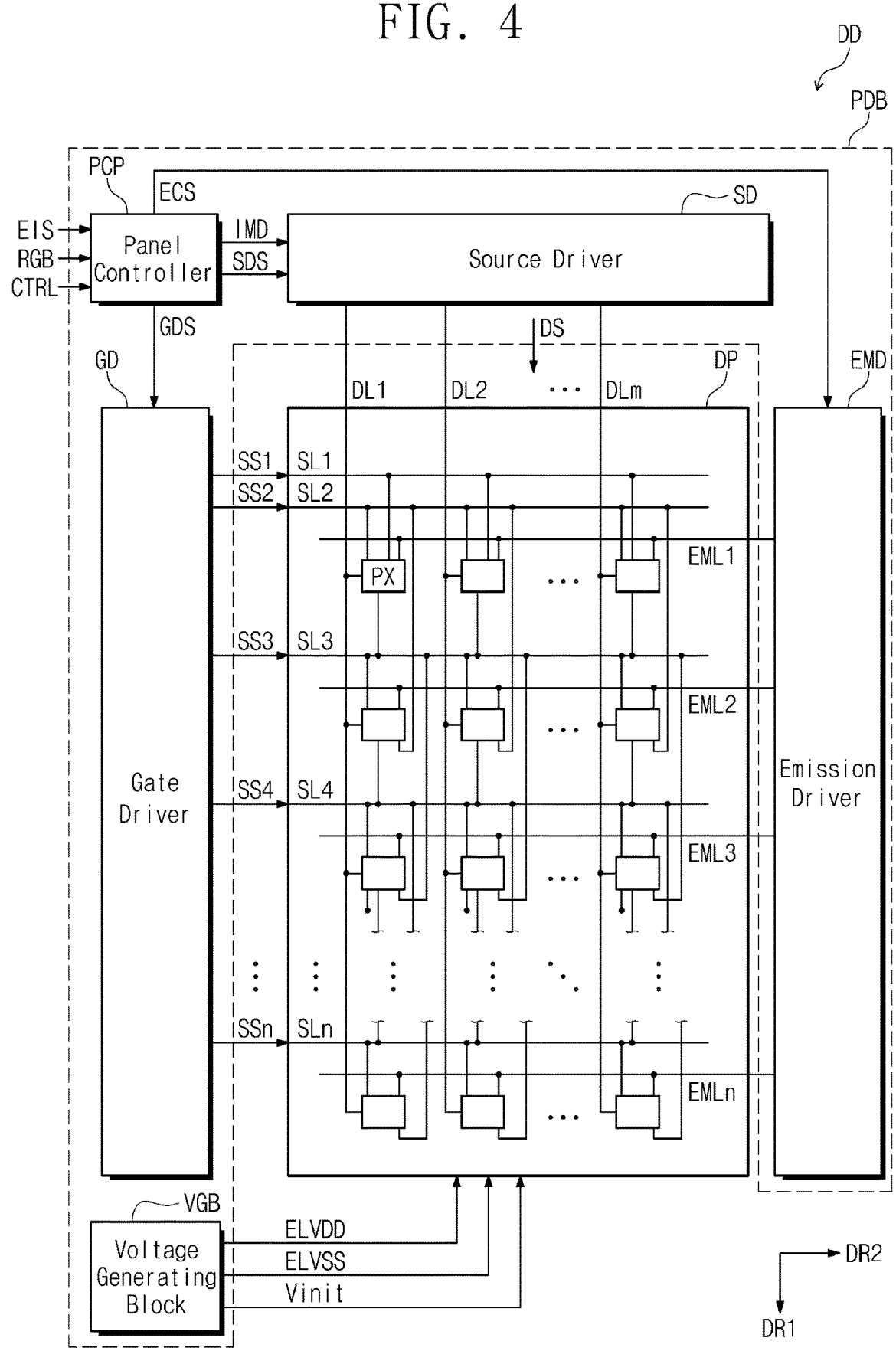
FIG. 4 is a block diagram of a display device according to an embodiment of the present disclosure.

FIG. 4 is a block diagram of a display device according to an embodiment of the present disclosure.

Referring to FIG. 4, as an example of the present disclosure, the display device DD includes the display panel DP and a panel driving block PDB. The panel driving block PDB includes a panel controller PCP, a source driver SD, a gate driver GD, a voltage generating block VGB, and an emission driver EMD.

The panel controller PCP receives the video signals RGB, an external control signal CTRL, and an external input signal EIS. The panel controller PCP generate a control signal CTS (refer to FIG. 9) for dividing the display area DA (refer to FIG. 1) into a first area AR1 and a second area AR2 adjacent to the first area AR1, based on the external input signal EIS. A configuration and an operation of the panel controller PCP that generates the control signal CTS based on the external input signal EIS will be described with reference to FIGS. 9, 10, 11A, 11B, and 12. The panel controller PCP generates image data IMD by converting a data format of the video signals RGB in compliance with the specification for an interface with the source driver SD. The panel controller PCP generates a source driving signal SDS, a gate driving signal GDS, and an emission control signal ECS based on the external control signal CTRL. The external control signal CTRL may include a vertical synchronization signal, a horizontal synchronization signal, a main clock, and the like.

The panel controller PCP provides the image data IMD and the source driving signal SDS to the source driver SD. The source driving signal SDS may include a horizontal start signal initiating an operation of the source driver SD. In response to the source driving signal SDS, the source driver SD generates a data signal DS based on the image data IMD. The source driver SD outputs the data signal DS to a plurality of data lines DL1 to DLm to be described later. The data signal DS may refer to an analog voltage corresponding to a grayscale value of the image data IMD.

The panel controller PCP transmits the gate driving signal GDS to the gate driver GD. The gate driving signal GDS may include a vertical start signal initiating an operation of the gate driver GD, a scan clock signal determining an output timing of scan signals SS1 to SSn, and the like. The gate driver GD generates the scan signals SS1 to SSn based on the gate driving signal GDS. The gate driver GD outputs the scan signals SS1 to SSn to a plurality of scan lines SL1 to SLn to be described later.

The panel controller PCP transmits the emission control signal ECS to the emission driver EMD. The emission driver EMD outputs emission control signals to a plurality of emission lines EML1 to EMLn in response to the emission control signal ECS.

The voltage generating block VGB generates voltages necessary for an operation of the display panel DP. As an example of the present disclosure, the voltage generating block VGB generates a first driving voltage ELVDD, a second driving voltage ELVSS, and an initialization voltage Vinit. As an example of the present disclosure, the voltage generating block VGB may operate under control of the panel controller PCP. As an example of the present disclosure, a voltage level of the first driving voltage ELVDD is greater than a voltage level of the second driving voltage ELVSS. As an example of the present disclosure, the voltage level of the first driving voltage ELVDD may be about 20 V to 30 V. A voltage level of the initialization voltage Vinit is smaller than the voltage level of the second driving voltage ELVSS. As an example of the present disclosure, the voltage level of the initialization voltage Vinit may be about 1 V to 9 V.

As an example of the present disclosure, the display panel DP includes the plurality of scan lines SL1 to SLn, the plurality of data lines DL1 to DLm, the plurality of emission lines EML1 to EMLn, and a plurality of pixels PX.

The scan lines SL1 to SLn extend from the gate driver GD in the second direction DR2 and are arranged to be spaced apart from each other in the first direction DR1. The data lines DL1 to DLm extend from the source driver SD in the first direction DR1 and are arranged to be spaced apart from each other in the second direction DR2.

Each of the pixels PX is electrically connected with three corresponding scan lines among the scan lines SL1 to SLn. Further, each of the pixels PX is electrically connected with one corresponding emission line among the emission lines EML1 to EMLn and one corresponding data line among the data lines DL1 to DLm. For example, as illustrated in FIG. 4, a first row of pixels may be connected with the first to third scan lines SL1, SL2, and SL3, the first emission line EML1, and the first data line DL1. However, a connection relationship between the pixels PX and the scan lines SL1 to SLn, the data lines DL1 to DLm, and the emission lines EML1 to EMLn may be changed depending on configurations of circuits driving the pixels PX.

Each of the pixels PX may include a light-emitting diode generating a color light. For example, the pixels PX may include red pixels generating a red color light, green pixels generating a green color light, and blue pixels generating a blue color light. A light-emitting diode of a red pixel, a light-emitting diode of a green pixel, and a light-emitting diode of a blue pixel may include emission layers of different materials. As an example of the present disclosure, each of the pixels PX may include white pixels generating a white color light. In this case, the display device DD may further include color filters. The display device DD may display the image IM based on lights output after the white color light passes through the color filters.

Each of the pixels PX includes a pixel circuit part controlling an emission operation of the light-emitting diode. The pixel circuit part may include a plurality of transistors and a capacitor. Each of the pixels PX receives the first driving voltage ELVDD, the second driving voltage ELVSS, and the initialization voltage Vinit.

Figure 5:
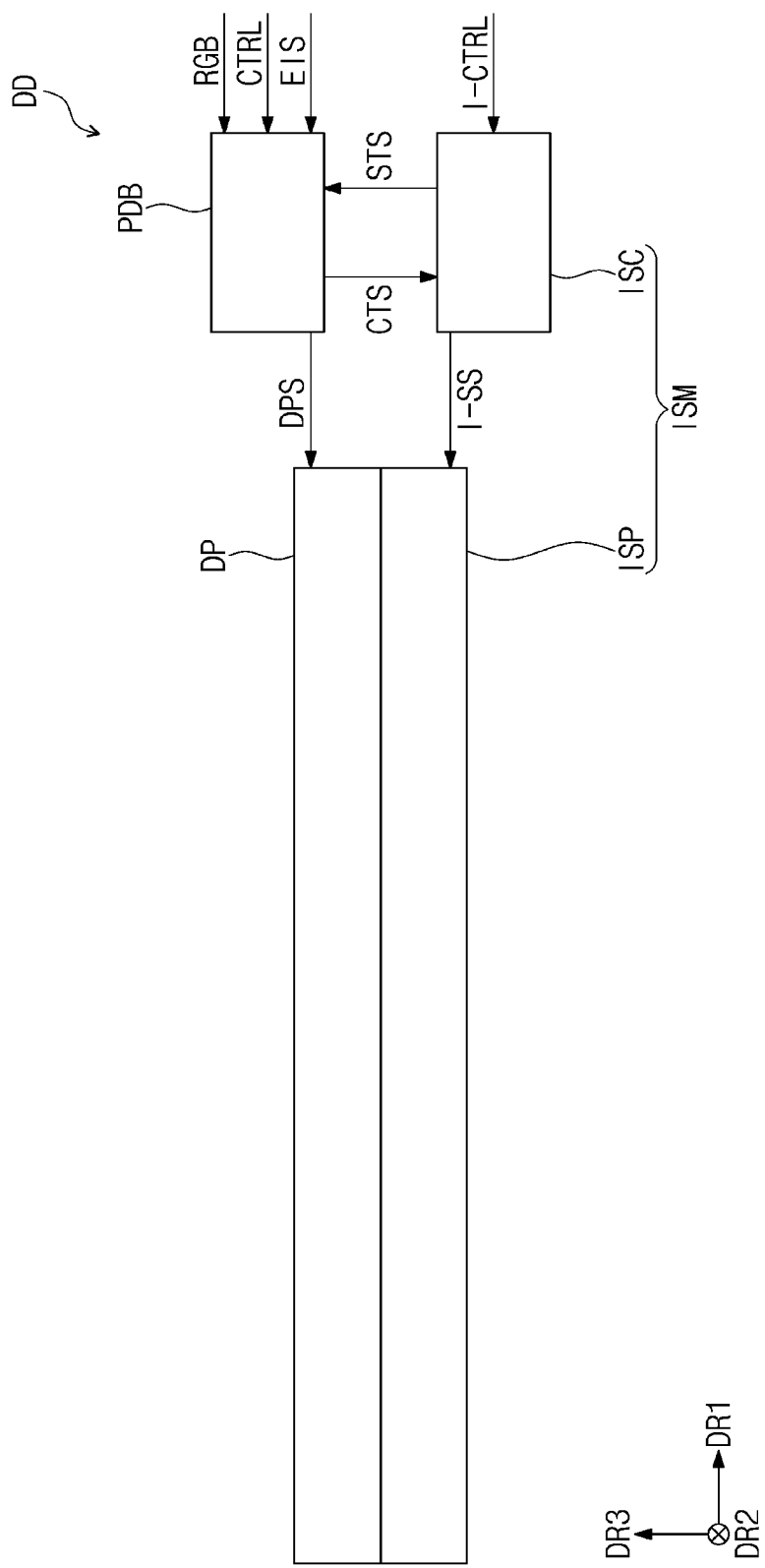
FIG. 5 is a block diagram illustrating a display device according to an embodiment of the present disclosure.

FIG. 5 is a block diagram illustrating a display device according to an embodiment of the present disclosure.

Referring to FIG. 5, the display device DD includes the display panel DP, the panel driving block PDB, and the instrument module ISM. As an example of the present disclosure, the instrument module ISM includes an instrument part ISP and an instrument controller ISC. Below, components that are the same as the components described with reference to FIG. 4 are marked by the same reference numerals, and thus, additional description will be omitted to avoid redundancy.

The instrument part ISP may be disposed under the display panel DP. As an example of the present disclosure, the display panel DP may be stretched to correspond to the movement of the instrument part ISP. The instrument part ISP may stretch the display panel DP in at least one of the first direction DR1 and the second direction DR2.

The instrument controller ISC receives the control signal CTS from the panel driving block PDB. The instrument controller ISC receives an instrument control signal I-CTRL necessary for the overall operation of the instrument controller ISC from an external source. The instrument controller ISC may control the movement of the instrument part ISP in response to the control signal CTS. As an example of the present disclosure, the instrument controller ISC generates an instrument movement signal I-SS for moving the instrument part ISP, based on the control signal CTS and the instrument control signal I-CTRL. The instrument part ISP receives the instrument movement signal I-SS from the instrument controller ISC and moves in response to the instrument movement signal I-SS. The instrument part ISP may move in at least one of the first direction DR1, the second direction DR2, and the third direction DR3 in response to the instrument movement signal I-SS and may stretch the display panel DP. However, the present disclosure is not limited thereto. For example, the instrument part ISP may rotate in a clockwise or counterclockwise direction such that the display panel DP is stretched. As an example of the present disclosure, the instrument part ISP is illustrated in FIG. 5 as extending in the first direction DR1, but the shape of the instrument part ISP is not limited thereto. For example, the instrument part ISP may include various shapes capable of stretching the display panel DP.

Figure 6A:
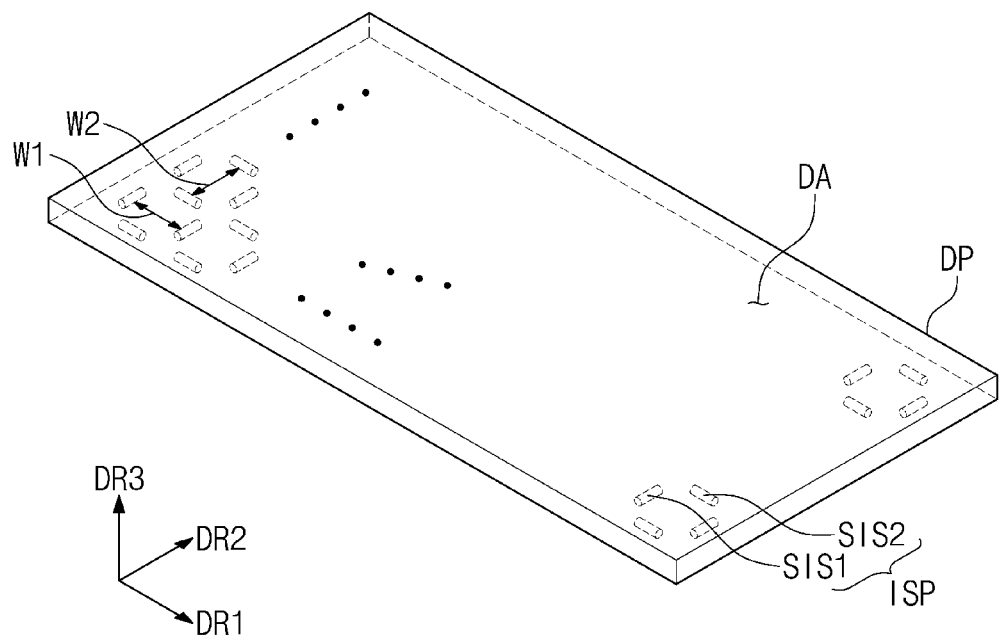
FIGS. 6A and 6B are perspective views for describing a display panel and an instrument part according to an embodiment of the present disclosure.
Figure 6B:
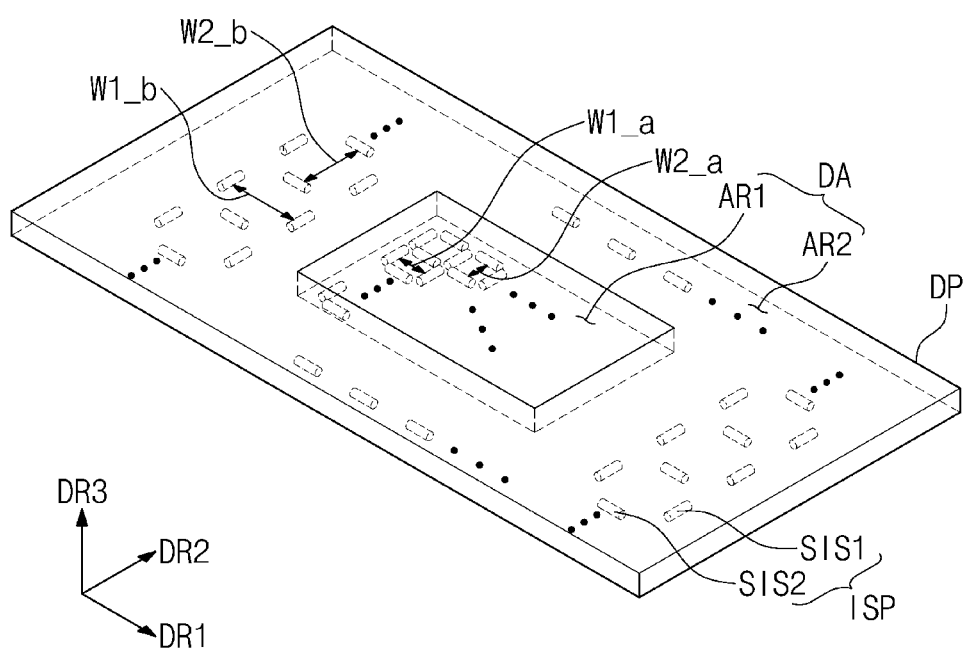
Figure 7A:
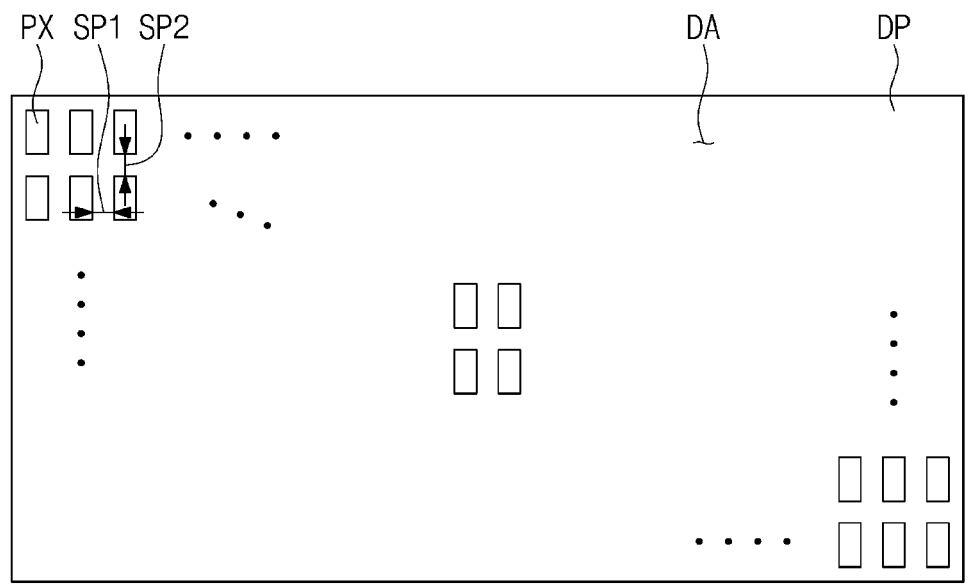
FIGS. 7A and 7B are conceptual diagrams for describing how pixels included in a display panel are arranged, according to an embodiment of the present disclosure.
Figure 7A:
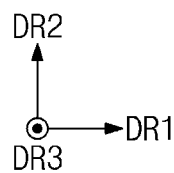
Figure 7B:
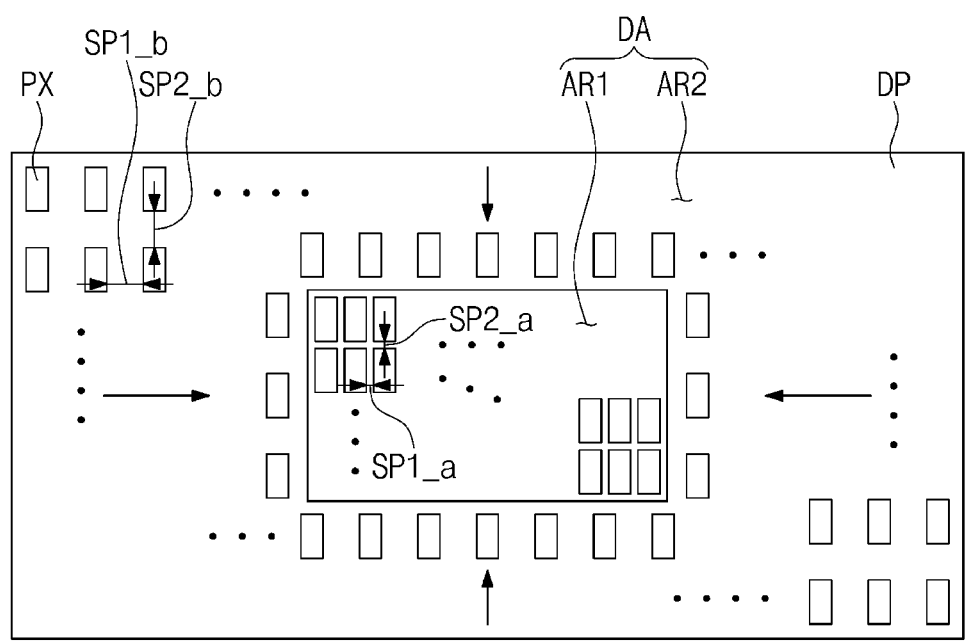

FIGS. 6A and 6B are perspective views for describing a display panel and an instrument part according to an embodiment of the present disclosure. FIGS. 7A and 7B are conceptual diagrams for describing how pixels included in a display panel are arranged, according to an embodiment of the present disclosure.

Referring to FIGS. 6A and 7A, the instrument part ISP disposed under the display panel DP includes a plurality of first sub-instrument parts SIS1 which are oriented in the second direction DR2 and spaced apart from each other in the first direction DR1 and a plurality of second sub-instrument parts SIS2 which are oriented in the first direction DR1 and spaced apart from each other in the second direction DR2. As an example of the present disclosure, each of the first sub-instrument parts SIS1 may extend in the second direction DR2. As an example of the present disclosure, each of the second sub-instrument parts SIS2 may extend in the first direction DR1. However, the present disclosure is not limited thereto. In another example, each of the first sub-instrument parts SIS1 may extend in the first direction DR1, and each of the second sub-instrument parts SIS2 may extend in the second direction DR2.

The arrangement of the first and second sub-instrument parts SIS1 and SIS2 before the display panel DP is stretched is illustrated in FIG. 6A. The pixels PX included in the display panel DP of an unstretched state are illustrated in FIG. 7A.

A distance between the first sub-instrument parts SIS1 in the first direction DR1 in a state where the display panel DP is not stretched is defined as a first space W1, and a distance between the second sub-instrument parts SIS2 in the second direction DR2 in the state is defined as a second space W2. That is, in this case, each of the first space W1 and the second space W2 is the unstretched distance. A distance between the pixels PX in the first direction DR1 in a state where the display panel DP is not stretched is defined as a first pixel space SP1, and a distance between the pixels PX in the second direction DR2 in the state is defined as a second pixel space SP2. That is, in this case, each of the first pixel space SP1 and the second pixel space SP2 is the unstretched distance. As an example of the present disclosure, in the display area DA, the first sub-instrument parts SIS1 may be spaced apart from each other in the first direction DR1 as much as the first space W1. As an example of the present disclosure, in the display area DA, the second sub-instrument parts SIS2 may be spaced apart from each other in the second direction DR2 as much as the second space W2. As an example of the present disclosure, in the display area DA, the pixels PX may be spaced apart from each other in the first direction DR1 as much as the first pixel space SP1. As an example of the present disclosure, in the display area DA, the pixels PX may be spaced apart from each other in the second direction DR2 as much as the second pixel space SP2. Accordingly, the number of pixels PX per unit area is uniform in the display area DA.

The arrangement of the first and second sub-instrument parts SIS1 and SIS2 moved to stretch the display panel DP is illustrated in FIG. 6B. The pixels PX included in the display panel DP of a stretched state are illustrated in FIG. 7B.

Referring to FIGS. 5, 6B, and 7B, the instrument controller ISC may control the movement of the first and second sub-instrument parts SIS1 and SIS2 in response to the control signal CTS such that the display panel DP is stretched. As an example of the present disclosure, the instrument controller ISC may control the movement of the first and second sub-instrument parts SIS1 and SIS2 in response to the control signal CTS such that the display area DA is divided into the first area AR1 and the second area AR2 adjacent to the first area AR1.

The instrument controller ISC may control the movement of first and second sub-instrument parts, which overlap the first area AR1, from among the first and second sub-instrument parts SIS1 and SIS2. In detail, the instrument controller ISC may move the first and second sub-instrument parts overlapping the first area AR1, in order to be disposed adjacent to each other. A distance in the first direction DR1 between the first sub-instrument parts overlapping the first area AR1 may be referred to as a first sub-space $W1\_a$. A distance in the second direction DR2 between the second sub-instrument parts overlapping the first area AR1 may be referred to as a second sub-space $W2\_a$. As an example of the present disclosure, the first sub-space $W1\_a$ is smaller than the first space W1 (refer to FIG. 6A). The second sub-space $W2\_a$ is smaller than the second space W2 (refer to FIG. 6A).

The instrument controller ISC may control the movement of first and second sub-instrument parts, which overlap the second area AR2, from among the first and second sub-instrument parts SIS1 and SIS2. In detail, the instrument controller ISC may move the first and second sub-instrument parts overlapping the second area AR2, in order to move away from each other. A distance in the first direction DR1 between the first sub-instrument parts overlapping the second area AR2 may be referred to as a third sub-space $W1\_b$. A distance in the second direction DR2 between the second sub-instrument parts overlapping the second area AR2 may be referred to as a fourth sub-space $W2\_b$. As an example of the present disclosure, the third sub-space $W1\_b$ is greater than the first space W1. The fourth sub-space $W2\_b$ is greater than the second space W2. However, the present disclosure is not limited thereto. Even though the instrument controller ISC does not move the first and second sub-instrument parts overlapping the second area AR2, when the instrument controller ISC moves the first and second sub-instrument parts overlapping the first area AR1 so as to be adjacent to each other, the third sub-space W1_b may be greater than the first space W1, and the fourth sub-space W2_b may become greater than the second space W2.

When the display panel DP is stretched, in the first area AR1 of the display panel DP, a distance between the pixels PX in the first direction DR1 is defined as a third pixel space SP1_a. In the first area AR1, a distance between the pixels PX in the second direction DR2 is defined as a fourth pixel space SP2_a. As an example of the present disclosure, the third pixel space SP1_a is smaller than the first pixel space SP1 (refer to FIG. 7A). The fourth pixel space SP2_a is smaller than the second pixel space SP2 (refer to FIG. 7A).

In the second area AR2 of the display panel DP, a distance between the pixels PX in the first direction DR1 is defined as a fifth pixel space SP1_b. In the second area AR2, a distance between the pixels PX in the second direction DR2 is defined as a sixth pixel space SP2_b. As an example of the present disclosure, the fifth pixel space SP1_b is greater than the first pixel space SP1. The sixth pixel space SP2_b is greater than the second pixel space SP2. Accordingly, in the display panel DP, the number of pixels PX per unit area in the first area AR1 is more than the number of pixels PX per unit area in the second area AR2. As a result, the number of pixels PX included in the display panel DP of FIG. 7A is equal to the number of pixels PX included in the display panel DP of FIG. 7B; however, by stretching the display panel DP, the display area DA may be divided into the first and second areas AR1 and AR2 in which the numbers of pixels PX per unit area are different. Accordingly, an image whose resolution is variable if necessary may be displayed through the display panel DP. The first area AR1 is illustrated in FIGS. 6A, 6B, 7A, and 7B as being located on a central portion of the display area DA, but the present disclosure is not limited thereto. The first area AR1 may be located on one side of the display area DA depending on the external input signal EIS (refer to FIG. 4). Further, the instrument controller ISC may move the instrument part ISP such that the number of pixels PX per unit area in the first area AR1 is less than the number of pixels PX per unit area in the second area AR2.

Figure 8:
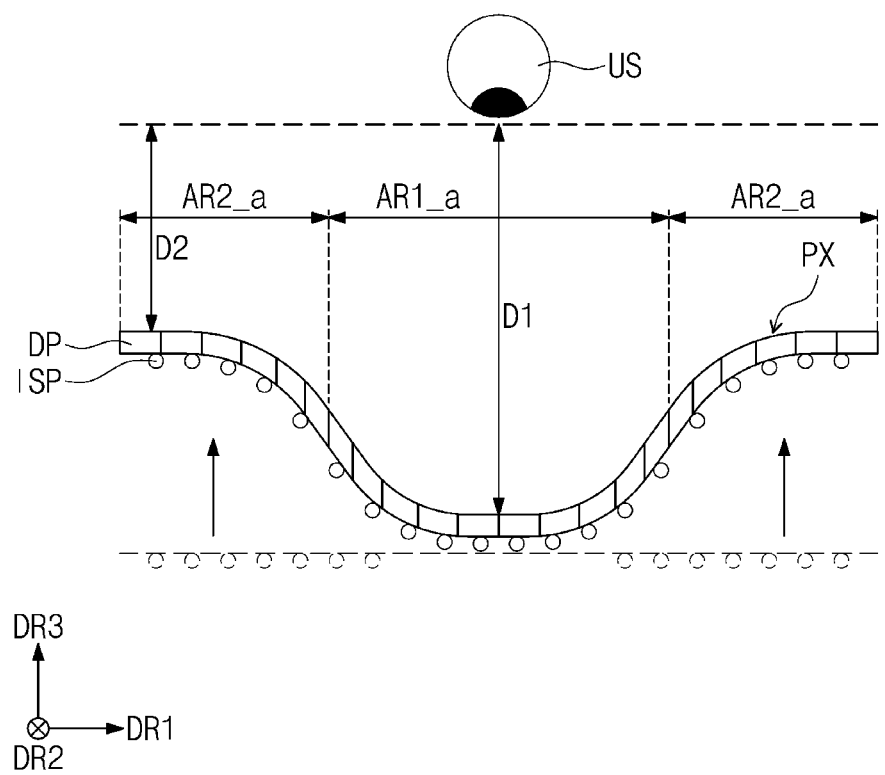
FIG. 8 is a cross-sectional view for describing a display panel and an instrument part according to an embodiment of the present disclosure.

FIG. 8 is a cross-sectional view for describing a display panel and an instrument part according to an embodiment of the present disclosure.

Referring to FIG. 8, when the display panel DP displays the image IM (refer to FIG. 1) in the third direction DR3, the instrument controller ISC (refer to FIG. 5) may control the instrument part ISP disposed under the display panel DP so as to move in the third direction DR3 and a direction facing away from the third direction DR3. As an example of the present disclosure, the instrument part ISP may be disposed on a surface of the display panel DP, which faces away from a surface through which the user US views the image IM. As an example of the present disclosure, the instrument controller ISC may move sub-instrument parts of the instrument part ISP, which overlap a second area AR2_a, in the third direction DR3. In this case, the number of pixels that the user US is capable of perceiving in a first area AR1_a is more than the number of pixels that the user US is capable of perceiving in the second area AR2_a. In detail, a distance D1 between the first area AR1_a of the display panel DP and the user US is longer than a distance D2 between the second area AR2_a of the display panel DP and the user US. Accordingly, the user US may perceives a resolution of the image IM displayed in the first area AR1_a as being higher than a resolution of the image IM displayed in the second area AR2_a.

Figure 9:
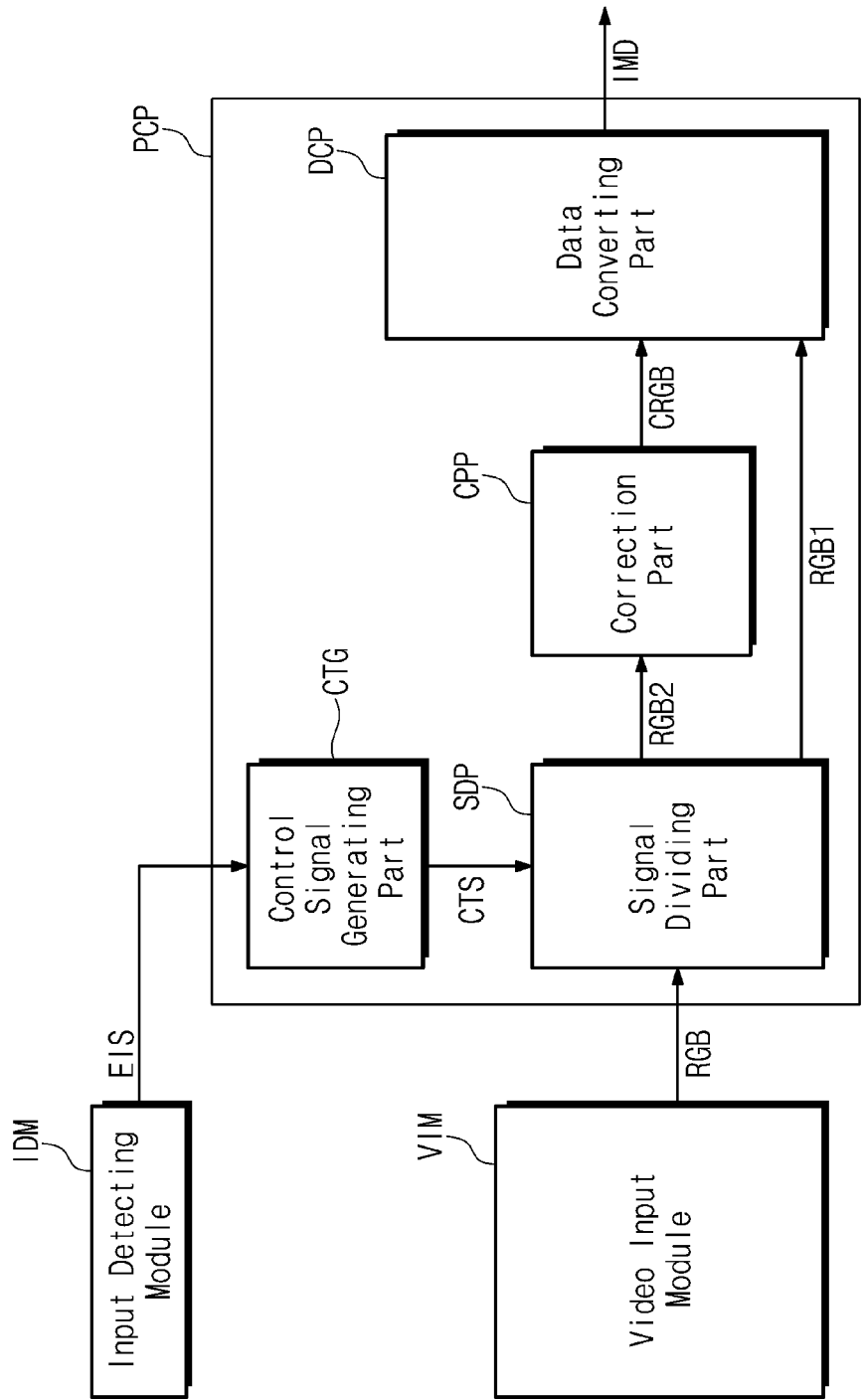
FIG. 9 is a diagram for describing a structure of a panel controller according to an embodiment of the present disclosure.
Figure 10:
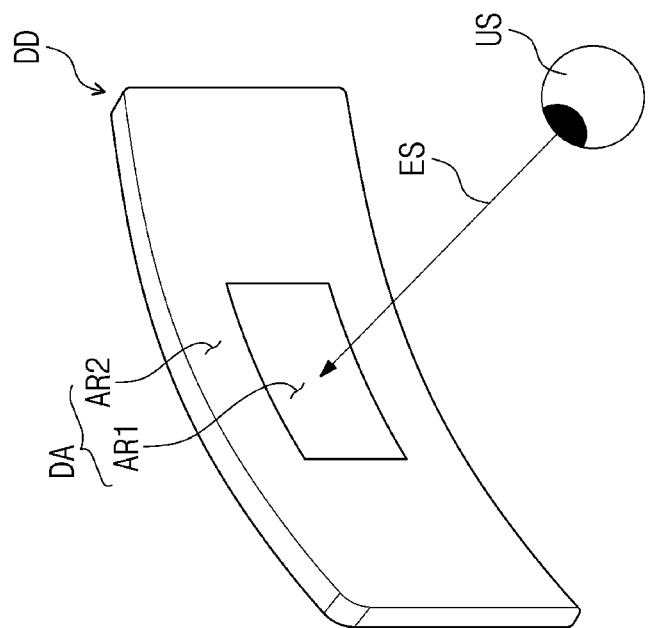
FIG. 10 is a conceptual diagram for describing an operation of a display device according to the gaze of a user according to an embodiment of the present disclosure.
Figure 11A:
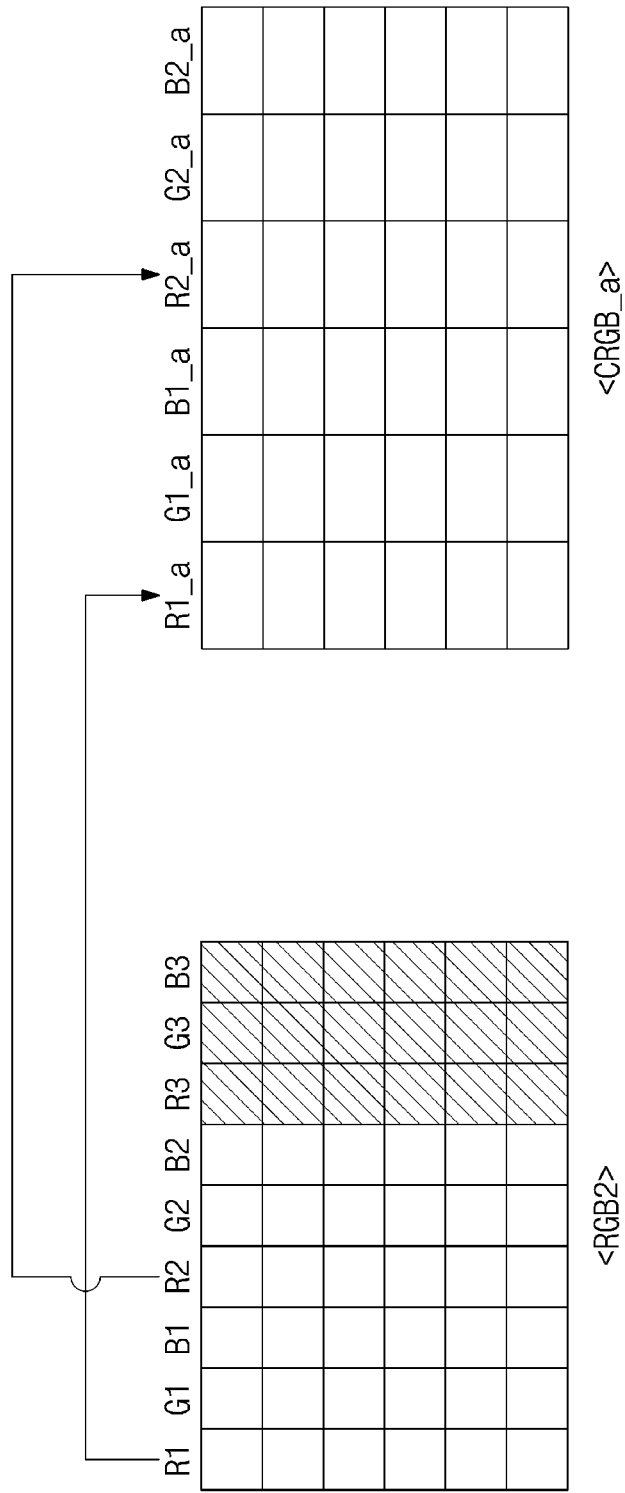
FIGS. 11A and 11B are conceptual diagrams for describing an operation of a correction part according to an embodiment of the present disclosure.
Figure 11B:
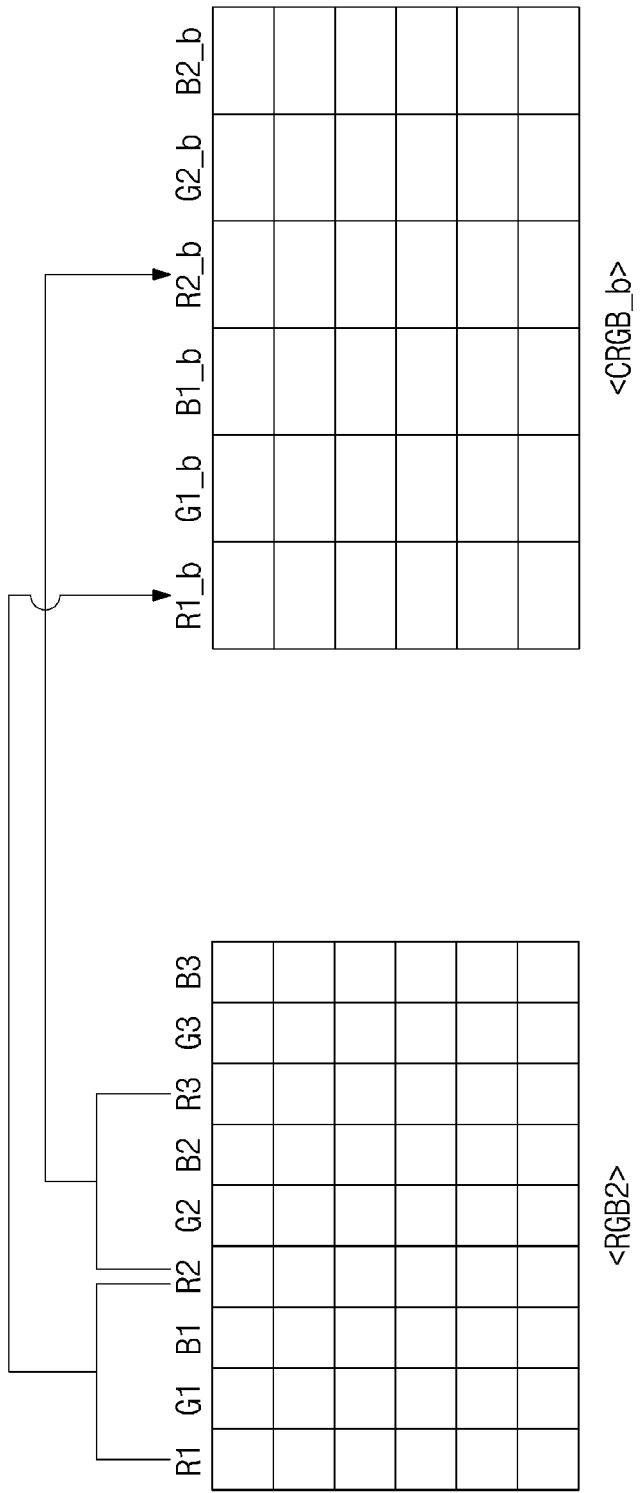

FIG. 9 is a diagram for describing a structure of a panel controller according to an embodiment of the present disclosure. FIG. 10 is a conceptual diagram for describing an operation of a display device according to the gaze of a user according to an embodiment of the present disclosure. FIGS. 11A and 11B are conceptual diagrams for describing an operation of a correction part according to an embodiment of the present disclosure. Below, components that are the same as the components described with reference to FIG. 2 are marked by the same reference numerals, and thus, additional description will be omitted to avoid redundancy.

Referring to FIGS. 7B, 9, and 10, the input detecting module IDM detects an external input that the user US (refer to FIG. 3) provides to the display device DD and transmits the external input signal EIS including information about the external input to the panel controller PCP. As an example of the present disclosure, the external input signal EIS may include information about the gaze ES that the user US provides to the display device DD. However, the present disclosure is not limited thereto. For example, the external input signal EIS may include information about an application that is executed in the electronic device ED (refer to FIG. 1) by the user US.

As an example of the present disclosure, the panel controller PCP includes a control signal generating part CTG, a signal dividing part SDP, a correction part CPP, and a data converting part DCP.

The control signal generating part CTG receives the external input signal EIS from the input detecting module IDM. The control signal generating part CTG generate the control signal CTS for dividing the display area DA into the first area AR1 and the second area AR2 based on the external input signal EIS. In detail, the control signal generating part CTG may generate the control signal CTS for the purpose of controlling the number of pixels PX per unit area in the first area AR1 and the number of pixels PX per unit area in the second area AR2. As an example of the present disclosure, when the external input signal EIS includes the information about the gaze ES that the user US provides to the display device DD, the control signal generating part CTG may generate the control signal CTS such that an area that the gaze ES of the user US faces is included in the first area AR1 and a surrounding area of the first area AR1 is classified as the second area AR2. Further, when the external input signal EIS includes the information about the application executed in the electronic device ED, the control signal generating part CTG may generate the control signal CTS based on information about the gaze ES of the user US using the application executed in the electronic device ED.

The signal dividing part SDP receives the video signals RGB from the video input module VIM and receives the control signal CTS from the control signal generating part CTG. The signal dividing part SDP divides the video signals RGB into a first video signal RGB1 corresponding to the first area AR1 and a second video signal RGB2 corresponding to the second area AR2 based on the control signal CTS. As an example of the present disclosure, the video signals RGB and the first and second video signals RGB1 and RGB2 may be signals corresponding to a first resolution. The first resolution may be a resolution that is determined by the number of pixels per unit area in the first area AR1 of the display panel DP stretched by the instrument module ISM (refer to FIG. 5). As an example of the present disclosure, as the video input module VIM transmits the video signals RGB corresponding to the first resolution to the panel controller PCP, the image IM whose quality is not reduced may be provided to the user US in the first area AR1 having the first resolution.

The correction part CPP receives the second video signal RGB2 from the signal dividing part SDP. The correction part CPP corrects the second video signal RGB2 to generate a corrected video signal CRGB. As an example of the present disclosure, the corrected video signal CRGB may be a video signal corrected to correspond to a second resolution. The second resolution may be a resolution that is determined by the number of pixels per unit area in the second area AR2 of the display panel DP stretched by the instrument module ISM. The number of pixels PX per unit area in the first area AR1 of the stretched display panel DP is different from the number of pixels PX per unit area in the second area AR2 thereof. Accordingly, the first resolution is different from the second resolution. As an example of the present disclosure, the number of pixels PX per unit area in the second area AR2 of the stretched display panel DP is less than the number of pixels PX per unit area in the first area AR1 thereof. Accordingly, the second resolution is lower than the first resolution. The corrected video signal CRGB may be a video signal corrected such that the second video signal RGB2 having the first resolution corresponds to the second resolution.

Conceptual diagrams for describing a rendering scheme of correcting the second video signal RGB2 to corrected video signals CRGB_a and CRGB_b are illustrated in FIGS. 11A and 11B. Below, for convenience, the description will be given as the second video signal RGB2 includes first to third red data R1, R2, and R3, first to third green data G1, G2, and G3, and first to third blue data B1, B2, and B3, the corrected video signal CRGB_a includes first and second corrected red data R1_a and R2_a, first and second corrected green data G1_a and G2_a, and first and second corrected blue data B1_a and B2_a, and the corrected video signal CRGB_b includes first and second corrected red data R1_b and R2_b, first and second corrected green data G1_b and G2_b, and first and second corrected blue data B1_b and B2_b. However, the present disclosure is not limited thereto. For example, kinds of data included in the second video signal RGB2 and the corrected video signal CRGB_a and CRGB_b may vary depending on the arrangement of the pixels PX and colors of lights that the pixels PX emit.

Referring to FIGS. 9 and 11A, the correction part CPP may convert "n" color data included in the second video signal RGB2 into "m" corrected color data. Here, "m" may be a natural number smaller than "n". According to an embodiment, three red data (hereinafter referred to as "first, second, and third red data") may be included in the second video signal RGB2. The corrected video signal CRGB_a may include two corrected red data (hereinafter referred to as "first and second corrected red data"). As an example of the present disclosure, the correction part CPP may convert the first red data R1 into the first corrected red data R2_a and may convert the second red data R2 into the second corrected red data R2_b. The third red data R3 included in the second video signal RGB2 may be discarded by the correction part CPP without conversion.

Referring to FIGS. 9 and 11B, the correction part CPP may generate the first and second corrected red data R1_b and R2_b by using the first to third red data R1, R2, and R3. According to an embodiment, the correction part CPP generates the first corrected red data R1_b by using the first red data R1 and the second red data R2. The correction part CPP generates the second corrected red data R2_b by using the second red data R2 and the third red data R3.

The data converting part DCP receives the corrected video signal CRGB from the correction part CPP and receives the first video signal RGB1 from the signal dividing part SDP. The data converting part DCP generates the image data IMD based on the first video signal RGB1 and the corrected video signal CRGB. The data converting part DCP transmits the image data IMD thus generated to the source driver SD (refer to FIG. 4).

Figure 12:
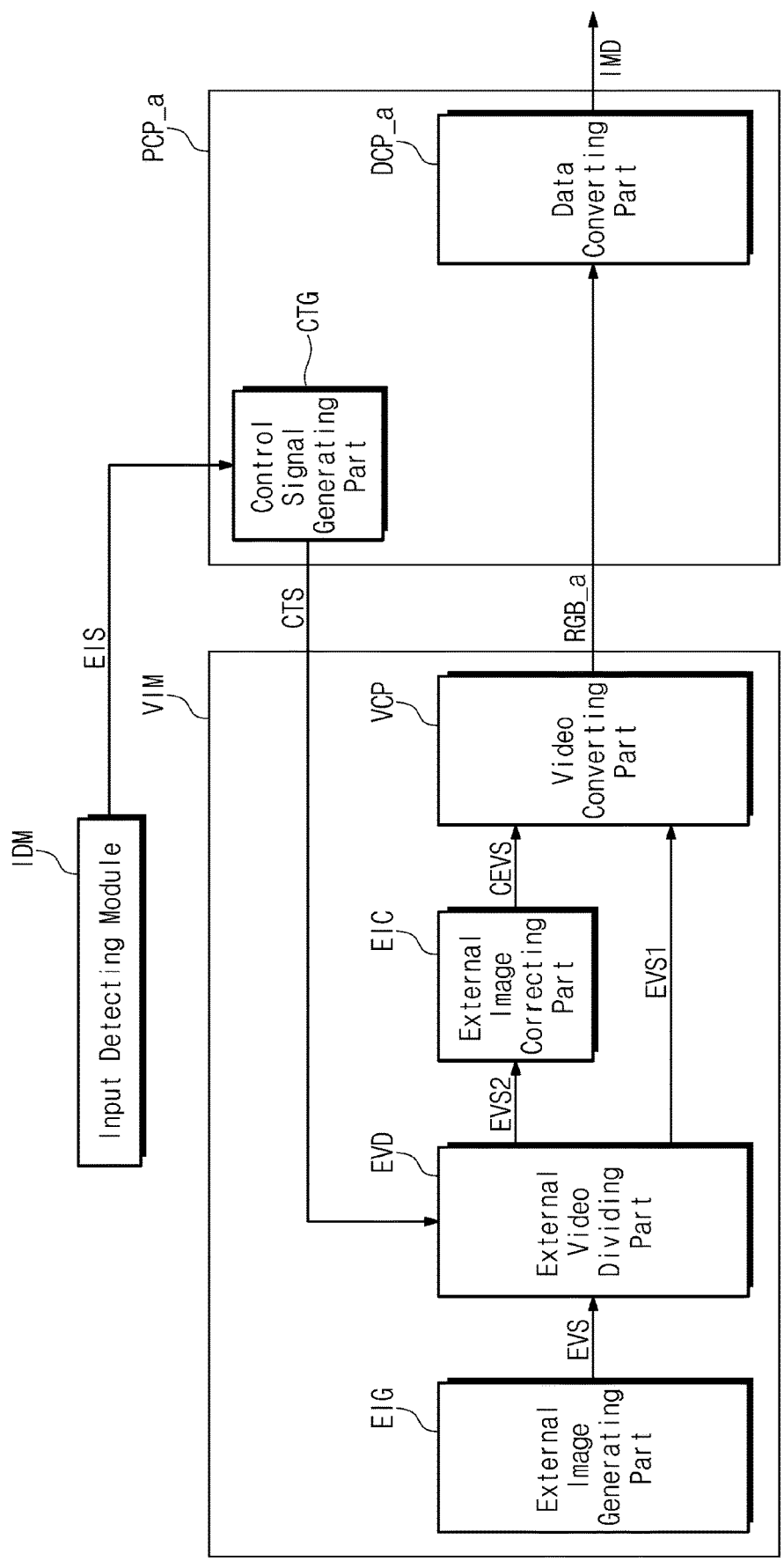
FIG. 12 is a block diagram for describing a structure of a video input module according to an embodiment of the present disclosure.

FIG. 12 is a block diagram for describing a structure of a video input module according to an embodiment of the present disclosure. Below, components and signals that are the same as the components and signals described with reference to FIGS. 9, 10, 11A, and 11B are marked by the same reference signs, and thus, additional description will be omitted to avoid redundancy.

Referring to FIGS. 7B and 12, the video input module VIM includes an external image generating part EIG, an external video dividing part EVD, an external image correcting part EIC, and a video converting part VCP.

The external image generating part EIG generates external video signals EVS for displaying the image IM (refer to FIG. 1) on the display panel DP when the display device DD is activated in response to an input of the user US (refer to FIG. 3).

The external video dividing part EVD receives the external video signals EVS from the external image generating part EIG and receives the control signal CTS from the control signal generating part CTG. The external video dividing part EVD divides the external video signal EVS into a first external video signal EVS1 corresponding to the first area AR1 and a second external video signal EVS2 corresponding to the second area AR2 based on the control signal CTS.

The external image correcting part EIC receives the second external video signal EVS2 from the external video dividing part EVD. The external image correcting part EIC corrects the second external video signal EVS2 to generate a corrected external video signal CEVS. As an example of the present disclosure, the external video signals EVS, the first external video signal EVS1, and the second external video signal EVS2 may be signals generated based on a first resolution. The corrected external video signal CEVS may be a signal set based on a second resolution lower than the first resolution.

The video converting part VCP receives the first external video signal EVS1 from the external video dividing part EVD and receives the corrected external video signal CEVS from the external image correcting part EIC. The video converting part VCP converts the first external video signal EVS1 and the corrected external video signal CEVS to generate the video signal RGB_a. The video converting part VCP transmits the video signal RGB_a to a data converting part DCP_a included in a panel controller PCP_a.

Assuming that the case where the correction part CPP is included in the panel controller PCP of FIG. 9 is a first case and the case where the external image correcting part EIC is included in the video input module VIM like FIG. 12 is a second case, power consumption of the electronic device ED (refer to FIG. 1) in the second case may be smaller than that in the first case. In detail, a video signal RGB_a of the second case includes a video signal corresponding to the first area AR1 and a video signal corrected to correspond to the second area AR2. In contrast, the video signal RGB (refer to FIG. 9) of the first case includes a video signal corresponding to the first area AR1 and a video signal that corresponds to the second area AR2 and is not corrected. Accordingly, a bandwidth of data included in the video signal RGB of the first case is greater than a bandwidth of data included in the video signal RGB_a of the second case. Accordingly, power consumption necessary to transmit the video signal RGB_a of the second case to the panel controller PCP_a is smaller than power consumption necessary to transmit the video signal RGB of the first case to the panel controller PCP (refer to FIG. 9).

A stretchable display device of the present disclosure may stretch a display panel for the purpose of dividing a display area, in which an image is displayed, into areas having the different numbers of pixels per unit area, based on an external input signal. As an example of the present disclosure, when the external input signal includes information about the gaze that a user provides to the stretchable display device, the number of pixels per unit area in a region of interest that the gaze of the user face may be controlled to be more than the number of pixels per unit area in a peripheral region adjacent to the region of interest. In this case, an image of a high resolution may be displayed in the region of interest, and an image of a relatively low resolution may be displayed in the peripheral region. Accordingly, power consumption of the stretchable display device may be reduced while providing an image of a high resolution to the user.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
    a display panel including a plurality of pixels and a display area and configured to display an image;
    a panel controller configured to receive an external input signal from an external source and to generate a control signal for dividing the display area into a first area and a second area which is disposed adjacent to the first area based on the external input signal; and
    an instrument module configured to stretch the first area and the second area of the display panel in response to the control signal,
    wherein a number of the pixels per unit area in the first area is different from a number of the pixels per unit area in the second area.

2. The display device of claim 1, wherein the instrument module includes:
    an instrument part disposed under the display panel to stretch the first area and the second area of the display panel; and
    an instrument controller configured to control a movement of the instrument part in response to the control signal.

3. The display device of claim 2, wherein the instrument part includes:
    a plurality of first sub-instrument parts spaced apart from each other in a first direction; and
    a plurality of second sub-instrument parts spaced apart from each other in a second direction intersecting the first direction, and
    wherein the instrument controller is configured to:
    control a movement of first and second sub-instrument parts overlapping the first area from among the first and second sub-instrument parts such that the first area of the display panel is stretched; and
    control a movement of first and second sub-instrument parts overlapping the second area from among the first and second sub-instrument parts such that the second area of the display panel is stretched.

4. The display device of claim 2, wherein the display panel displays the image in a third direction, and
    wherein the instrument controller allows the instrument part to be stretched in the third direction or a direction facing away from the third direction such that the first area and the second area of the display panel are stretched.

5. The display device of claim 2, wherein the panel controller receives video signals from the external source and generates image data based on the video signals.

6. The display device of claim 5, wherein the panel controller includes:
    a signal dividing part configured to divide the video signals into a first video signal corresponding to the first area and a second video signal corresponding to the second area based on the control signal; and
    a correction part configured to correct the second video signal to generate a corrected video signal.

7. The display device of claim 6, wherein the video signals, the first video signal, and the second video signal are video signals corresponding to a first resolution, and
    wherein the corrected video signal is corrected to correspond to a second resolution which is lower than the first resolution.

8. The display device of claim 7, wherein the first resolution is determined by the number of the pixels per unit area in the first area, and the second resolution is determined by the number of the pixels per unit area in the second area.

9. The display device of claim 6, wherein the panel controller further includes a control signal generating part configured to:
    receive the external input signal;
    divide the display area into the first area and the second area based on the external input signal; and
    generate the control signal in order to control the number of the pixels per unit area in the first area and the number of the pixels per unit area in the second area.

10. The display device of claim 9, wherein the instrument controller receives the control signal from the control signal generating part.

11. The display device of claim 9, wherein the panel controller further includes a data converting part configured to:
    receive the first video signal and the corrected video signal; and
    generate the image data based on the first video signal and the corrected video signal.

12. The display device of claim 1, wherein the external input signal includes information regarding gaze that a user provides to the display device,
    wherein the panel controller generates the control signal such that an area of the display area, where the gaze of the user face is at, is included in the first area; and
    wherein the number of the pixels per unit area in the first area is larger than the number of the pixels per unit area in the second area.

13. An electronic device comprising:
    a display device configured to display an image; and
    an input detecting module configured to detect an external input that a user provides to the display device, wherein the display device includes:
- a display panel including a plurality of pixels and a display area and configured to display the image;
- a panel controller configured to receive an external input signal from the input detecting module and to generate a control signal for dividing the display area into a first area and a second area which is disposed adjacent to the first area based on the external input signal; and
- an instrument module configured to stretch the first area and the second area of the display panel in response to the control signal, and
- wherein a number of the pixels per unit area in the first area is different from a number of the pixels per unit area in the second area.

14. The electronic device of claim 13, wherein the external input signal includes information regarding gaze that the user provides to the display device.

15. The electronic device of claim 14, wherein the panel controller generates the control signal such that an area of the display area, where the gaze of the user face is at, is included in the first area, and
wherein the number of the pixels per unit area in the first area is larger than the number of the pixels per unit area in the second area.

16. The electronic device of claim 13, further comprising:
- a video input module configured to generate external video signals and to transmit a video signal obtained by converting the external video signals to the panel controller.

17. The electronic device of claim 16, wherein the video input module includes:
- an external video dividing part configured to receive the control signal from the panel controller and to divide the external video signals into a first external video signal corresponding to the first area and a second external video signal corresponding to the second area based on the control signal;
- an external image correcting part configured to correct the second external video signal to generate a corrected external video signal; and
- a video converting part configured to convert the first external video signal and the corrected external video signal to generate the video signal.

18. The electronic device of claim 17, wherein the external video signals, the first external video signal, and the second external video signal are signals set based on a first resolution, and
wherein the corrected external video signal is based on a second resolution which is lower than the first resolution.

19. The electronic device of claim 18, wherein the first resolution is determined by the number of the pixels per unit area in the first area, and the second resolution is determined by the number of the pixels per unit area in the second area.

20. The electronic device of claim 13, wherein the external input signal includes information about an application executed in the electronic device by the user.

* * * * *